Figure 1:
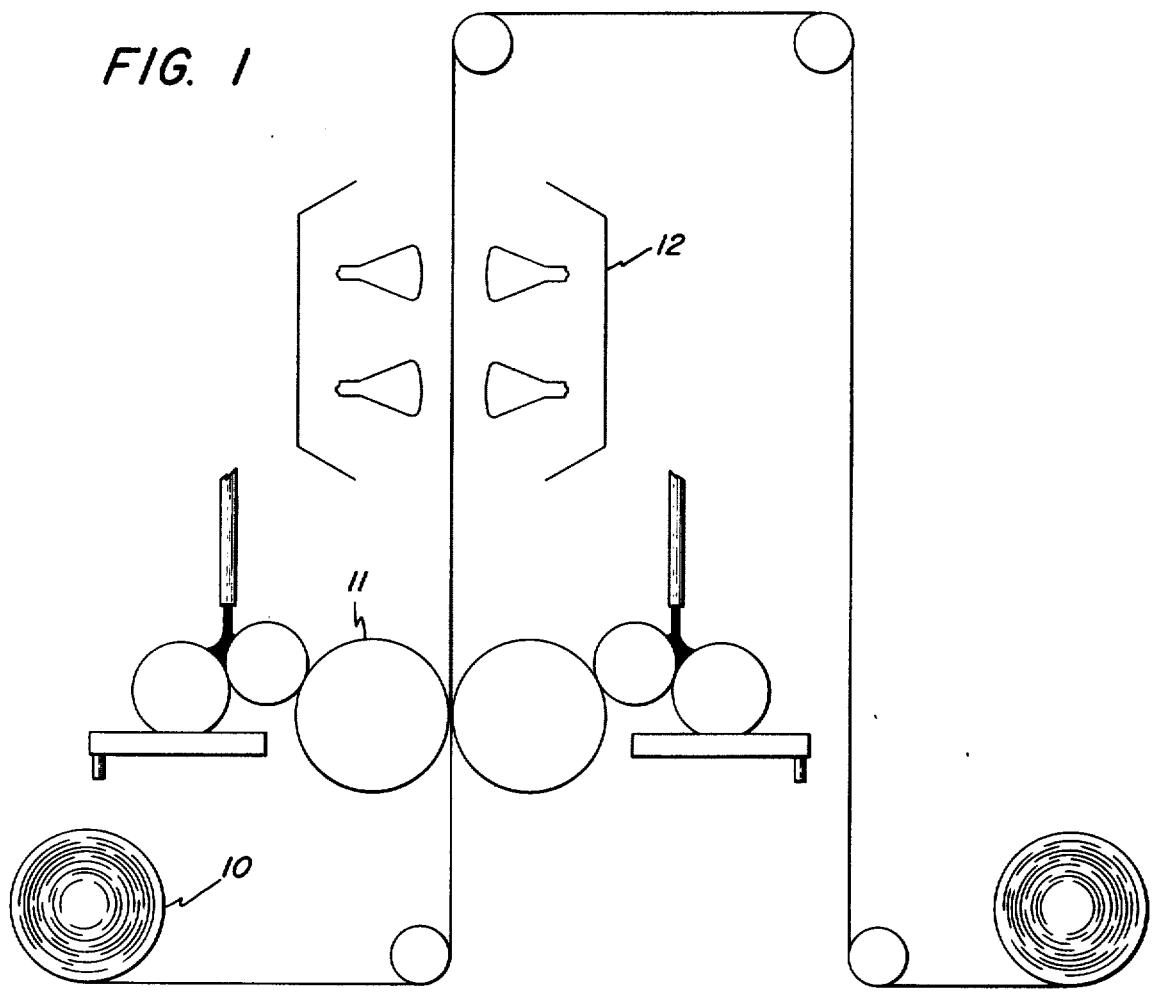

United States Patent [19]

Schroeter et al.

[11] 3,875,094

[45] Apr. 1, 1975

[54] RADIATION CURABLE POLYESTER

[75] Inventors: Siegfried Herman Schroeter, Schenectady; Ona V. Orkin, Latham, both of N.Y.

[73] Assignee: General Electric Company, Schenectady, N.Y.

[22] Filed: Feb. 22, 1974

[21] Appl. No.: 444,860

[52] U.S. Cl............. 260/28, 117/93.31, 117/132 R, 204/159.15, 260/861
[51] Int. Cl................................................ C08h 9/06
[58] Field of Search.......... 260/861, 28; 204/159.15

[56] References Cited
UNITED STATES PATENTS 3,619,392  11/1971  Metzner et al........................ 260/28
3,674,727  7/1972  Fekete.............................. 260/861
3,721,723  3/1973  Heidel et al.......................... 260/28

*Primary Examiner*—Melvyn I. Marquis
*Attorney, Agent, or Firm*—William A. Teoli; Joseph T. Cohen; Jerome C. Squillaro

[57] ABSTRACT

Certain wax containing UV curable polyester resins are provided which can be used to improve the insulating characteristics of oriented steel strip useful in making power transformer core laminate. The resins can be continuously applied and cured in a substantially pollution free manner.

6 Claims, 2 Drawing Figures

RADIATION CURABLE POLYESTER

The present invention relates to certain wax containing UV curable polyester resins which can be continuously applied and cured on oriented steel strip in a substantially pollution free manner.

As shown in copending application Ser. No. 444,859 of S. Schroeter, J. VanWinkle and C. French, filed concurrently herewith and assigned to the same assignee as the present invention, organic resins have been used to improve the insulating characteristics of oriented steel strip having an inorganic surface coating. The resulting organic resin-inorganic coating-oriented steel strip composite can be thereafter spliced and sheared to make power transformer core laminate.

Although the use of organic resins has enhanced the insulating characteristics of transformer core laminate as taught in Ser. No. 444,859, the use of conventional organic insulating varnishes having major amounts of organic solvent can result in significant air pollution, or uneconomic procedures.

One solution to the air pollution problem, as taught in copending application of A. N. Wright and Siegfried H. Schroeter, Ser. No. 374,482, filed June 28, 1973, and assigned to the same assignee as the present invention is to employ UV curable solventless organic resins in place of standard organic insulating varnish. It has been found, however, in many instances, even though the cure of the solventless UV curable resins on the oriented steel strip can be achieved in a substantial pollution free manner, additional requirements must be satisfied before the resulting organic resin-inorganic coating-oriented steel strip is useful as power transformer core laminate.

One of the basic needs of the power transformer industry is the production of oriented steel strip-organic resin composite which can be immersed without substantial change for a period of up to about 30 years in 10C hydrocarbon oil at about 100°C as transformer core laminate. Unless the organic resin is capable of resisting breakdown under such conditions, insulation failure can occur. In addition, contamination of the 10C hydrocarbon oil can result causing alteration in dielectric characteristics leading to eventual corona damage to the transformer.

In order to determine the ability of organic resins to resist breakdown and impart improved insulating characteristics to oriented steel strip for purposes of satisfying the needs of the power transformer industry, certain accelerated aging tests can be used. For example, ASTMD971-50, Interfacial Tension of Oil Against Water, can be used to measure the ability of the resin to resist breakdown in 10C oil. A further criterion is heat stability, whereby less than about a 10 percent weight loss is required after the cured resin is heated at a temperature in the range of 140°C to 160°C over a 1,000 hour period.

The present invention is based on the discovery that certain wax containing UV curable solventless organic resin blends of vinyl aromatic organic compound and certain unsaturated polyester reaction products can be applied to oriented steel strip in a pollution-free manner to provide power transformer core laminate capable of meeting the exacting standards of the power transformer industry.

There is provided by the present invention, a solventless UV curable polyester composition having a viscosity of from 500 centipoises to 3,000 centipoises and containing the following essential ingredients by weight:

A. 20 to 40 percent of a vinyl aromatic material selected from styrene, vinyl toluene, tert-butylstyrene and mixtures thereof, B. 80 to 60 percent of an unsaturated polyester reaction product of (i) a glycol and (ii) an aliphatically unsaturated organic dicarboxylic acid, where
  i. is a glycol selected from the class consisting of
    a. a mixture of 20–60 mole percent of neopentyl glycol and 40–80 mole percent of a member selected from propylene glycol, ethylene glycol and mixtures thereof, and
    b. a mixture of (a) and 1 to 40% by weight thereof of trimethylolpropane monoallyl ether, and
  ii. is an aliphatically unsaturated organic dicarboxylic acid consisting essentially of a mixture of 50 to 65 mole percent of fumaric acid and 35 to 50 mole percent of a member selected from tetrahydrophthalic anhydride, endomethylene tetrahydrophthalic anhydride and mixtures thereof where there is utilized in making the unsaturated polyester reaction product of (B) up to at least about 10 mole percent excess of the glycol of (i) over the aliphatically unsaturated organic dicarboxylic acid of (ii)

C. 1 to 5% based on the weight of (A) and (B) of a UV sensitizer, and

D. 0.05 to 1% based on the weight of (A), (B) and (C) of paraffin wax.

The above described unsaturated polyester can be made by standard techniques involving either a one-step or two-step reaction procedure. The two-step procedure can involve reacting the total glycol at temperatures up to about 200°C, which can consist of a mixture of propylene glycol and neopentyl glycol, with tetrahydrophthalic anhydride. A hydrocarbon azeotroping solvent can be employed to facilitate removal of water of reaction. Upon allowing the reaction mixture to cool, an acid number of from 1 to 25 indicates completion of the first stage of the reaction. The fumaric acid can then be added to the mixture with stirring and it is heated further until an acid number of 5 to 15 is obtained. In the one stage cook procedure, the acid number may be as high as 30.

In preparing the UV curable polyester composition, the vinyl aromatic solvent containing the paraffin wax and inhibitor can be added with stirring to the above prepared unsaturated polyester reaction product while it is warm. After the mixture has been allowed to cool to room temperature, an effective amount of the UV sensitizer can be added Among the UV radiation photosensitizers which can be used in the curable wax containing polyester compositions of the invention are, for example, ketones, such as benzophenone, acetophenone, benzil, benzyl methyl ketone; benzoins and substituted benzoins such as benzoin methyl ether, α-hydroxymethyl benzoin isopropyl ether; halogen containing compounds such as α-bromoacetophenone, p-bromoacetophenone, α-chloromethyl naphthalene, sulfur compounds such as aromatic disulfides, and other photosensitizers such as azides, dyes, thioketones, or mixtures or synergistic mixtures thereof. Other compounds, at levels which do not interfere with the cure, may also be added. Such compounds are, for example, inhibitors such as hydroquinone, tert-butyl hydroquinone, tert-butyl catechol, p-benzoquinone, 2,5-diphenylbenzoquinone, 2,6-ditert-butyl-p-cresol, etc.; various fillers, flatting agents, thixotroptic agents, dyes and pigments such as barytes, blanc fixe, gypsum, calcium carbonate, quartz, diatomaceous silica, synthetic silica, clay, talc, asbestine, mica, bentonite, aerogels, glass fibers, ultramarine blue, etc. In addition to the afore-described ingredients, up to 2% and preferably 0.05 to 0.3% of a wax. Suitable waxes include, for example, low melting paraffin waxes having a melting point of about 40° to 60°C.

In FIG. 1 there is shown an oriented steel strip being treated by a roller coater which is passed through a UV curing oven and thereafter collected.

Figure 2:
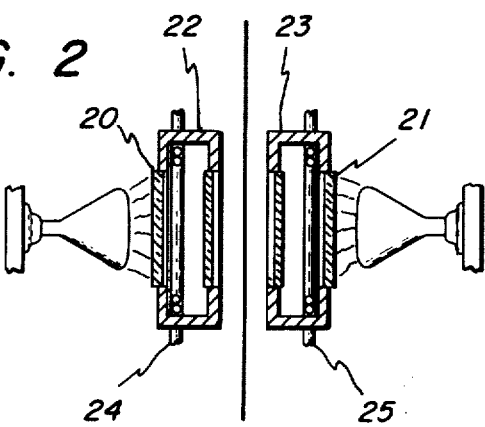

In FIG. 2 there is shown in detail a view of the oriented steel strip passing between the UV lamps.

As shown more particularly in FIG. 1, a roller coater at 11 can be employed to continuously apply the irradiation curable organic resin onto the oriented steel strip at 10. The treated strip, in a preferred embodiment, can be passed through a UV curing zone 12 to effect the cure of the organic resin on the surface of the oriented steel strip. However, if desired, cure also can be effected by an electron-beam accelerator having an accelerator voltage of from about 150 to 3000 KV. The electrode current should as a rule have a strength between about 10 and 100 ma.

As indicated, cure of the organic resin is preferably effected by using UV irradiation which can have a wavelength of from 1849 A. to 4000 A. The lamp systems used to generate such radiation can consist of ultraviolet lamps such as at 13 which can consist of from 1 to 50 discharge lamps, for example, xenon, metallic halide, metallic arc, such as a low or high pressure mercury vapor discharge lamp, etc. having operating pressures of from as low as a few milli-torr up to about 10 atmospheres, etc., can be employed. The lamps can include envelopes capable of transmitting light of a wavelength of from about 1849 A. to 4000 A., and preferably 2400 A. to 4000 A. The lamp envelope can consist of quartz, such as spectrocil, etc. Typical lamps which can be employed for providing ultraviolet radiation are, for example, medium pressure mercury arcs, such as the GE H3T7 arc, etc. The cures may be carried out with a combination of various lamps, some or all of which may operate in an inert atmosphere.

In operating the lamp to achieve a desirable level of flux intensity required for effecting cures of the solventless resin in a pollution-free manner, the lamps can be ballasted to provide a higher watts per inch input than that normally rated by the manufacturer. For example, the GE H3T7 lamp normally operated at 130 watts per inch, can be operated at up to 300 watts per inch input over a satisfactory operating life.

In addition to the above-described lamp means for generating ultraviolet radiation employed in the practice of the invention, as shown in FIG. 2, the means for providing such ultraviolet radiation in the apparatus used therein also includes radiation filtering means, such as quartz windows at 20 and 21, employed in combination with the lamp and reflector to provide means for ultraviolet radiation having a wavelength of from between about 1849 A. to 4000 A., while effecting the removal of radiation greater than 7500 A. The aforementioned windows can be made of any suitable material capable of transmitting ultraviolet at a wavelength of between 1849 A. to 4000 A., such as quartz, Pyrex, Vycor, plastic sheets such as polymethylmethacrylate, etc. Typically, the filters can be approximately the same size as the lamps or larger.

Thermal control means at 22 and 23 optionally can include support means for the radiation filters, which when separated to a satisfactory degree, such as 1 inch or more, can provide a channel to allow for the passage of air or water, to remove heat from the radiation filters. Removal of heat also can be achieved by the employment of cooling coils at 24 and 25 in instances where filter support means are employed.

The oriented steel strip which can be used in the practice of the invention can include any electrical or magnetic steel suitable core material for power transformer. Such steel can include silicon steel strip having a thickness of 5 to 50 mil and a width of 2 to 60 in.

It has been found advantageous to coat the oriented steel with up to 0.2 mil of resin and a rate of up to 100 to 600 feet per minute.

When using UV lamps the irradiation flux in the substrate can be at least 0.01 watts per square inch to effective organic resin a cure within 1 to 20 sec. and permit the steel strip to be taken up at a rate of from 100 to 600 feet per minute. Preferably, the strip is cut to a predetermined length for use as transformer laminate.

In order that those skilled in the art will be better able to practice the invention, the following examples are given by way of illustration and not by way of limitation. All parts are by weight.

EXAMPLE 1

A polyester was prepared by initially stirring and refluxing under nitrogen, a mixture of ingredients for about 4 hours at a temperature of up to about 200°C. The mixture consisted of 0.50 mole of tetrahydrophthalic anhydride, 0.70 mole of propylene glycol, 0.40 mole of neopentyl glycol and 15 ml of toluene. At the termination of the reaction, the reaction product had an acid number of about 10. The reaction product was allowed to cool to room temperature.

There was added to the above reaction product, 0.50 mole of fumaric acid, and the mixture was then heated and stirred to a temperature of up to 200°C until a final acid number of about 10 was obtained. Volatiles were removed from the final product by blowing with nitrogen.

The above polyester reaction product was heated to 130°C and there was added 0.03 percent of hydroquinone. The polyester was allowed to cool to about 110°C and there was added with stirring a 0.2 percent styrene solution of a paraffin wax having a m.p. of 133° to 135°F. There was added sufficient styrene to produce a composition having about 30 percent by weight styrene. When the mixture cooled to room temperature, there was added as a UV sensitizer, about 3 percent by weight of the mixture of a blend of isobutyl and n-butyl ethers of benzoin. Based on method of preparation, the resulting mixture was a wax containing UV curable polyester composition. It had a viscosity of about 1500 centipoises.

The above UV curable polyester composition was evaluated as an insulating coating material on oriented silicon steel strip having an inorganic coating, such as a Carlite coating. The resin was wire drawn to a thickness of about 0.1 mil onto a 20 mil Carlite coated 2 × 6 inches oriented silicon steel strip. The treated steel strip was then placed under one H3T7 lamp at distances of 4 inches for a period of 20 seconds. The lamps were ballasted at 300 watts per inch to provide a flux of UV light having a wavelength of from 1948A. to 4000 A., on the surface of the strip of at least 0.01 watts per square inch. After exposure, the same procedure was repeated to produce an oriented steel strip having both sides coated with the cured resin. The final weight of the composite resin-oriented steel strip was compared to the total weight of the untreated steel strip and applied resin to determine the total weight loss, or "air pollution factor" occurring during the application and cure of the resin. Degree of resin cure was based on the hardness required to obtain a Franklin reading in accordance with ASTM A344-68 which indicated the insulating characteristics of the resin. A further test to determine the ability of the resin to withstand hydrolysis in 10C hydrocarbon oil over an extended period of exposure was the IFT test ASTMD971-50 Interfacial Tension of Oil Against Water.

In addition, a 5 mil sample of the cured resin was heated for 1000 hours at 150°C to determine "heat stability" based on weight loss.

The above procedure was repeated, except that in place of the above wax containing polyester prepared in accordance with the invention, there was used the wax containing polyester shown in U.S. Pat. No. 3,531,317, Patheiger et al. The following results were obtained where "Schroeter" indicates the resin of the invention, and "Patheiger" indicates the prior art resin, "Franklin" indicate insulation characteristic, IFT is defined above where a value of at least 30 is necessary, and "Heat Stability" (weight loss) is defined above.

|  | Franklin | IFT | Heat Stability |
|---|---|---|---|
| Schroeter | 0 | 33 | 5% |
| Patheiger | 0 | 23 | 15% |

Inasmuch as an IFT value above 30 is necessary, and a weight loss above 10% cannot be tolerated, those skilled in the art would know that the resin of Patheiger would fail as a power transformer resin.

EXAMPLE 2

A polyester is prepared as described in Example 1 using ethylene glycol in place of propylene glycol. The acid number of the polyester is 25. A 35% styrene solution of the polyester is prepared having 0.03% hydroquinone and 0.2% wax (m.p. 133°-135°F) based on solids. A 0.1 mil film sensitized with 3% mixture of a blend of iso-butyl and n-butyl ethers of benzoin cures at 4 inches from a GE H3T7 lamp for 20 seconds gives an IFT value of 32.

EXAMPLE 3

A polyester is prepared as described in Example 1 replacing the tetrahydrophthalic anhydride by endomethylene tetrahydrophthalic anhydride. The acid number is 25 and the viscosity of the 30% styrene solution containing 0.2% wax (m.p. 133°-135°F) and 0.03% of hydroquinone is 1480 centipoises. A 0.1 mil film sensitized with 3% blend of iso-butyl and n-butyl ethers of benzoin cures at 4 inches from a GE H3T7 lamp for 20 seconds gives an IFT value of 30.5. A cured 4 mil film containing 35% styrene has a weight loss of 6%.

EXAMPLE 4

A polyester is prepared as described in Example 1 replacing 10 mole percent neopentyl glycol and 10 mole percent propylene glycol with trimethylolpropane monoallyl ether. The acid number is 29. The viscosity of a 35 weight percent solution of styrene containing 0.2 weight percent wax (m.p. 133°-135°F) and stabilized with 0.03 parts by weight of the polyester of hydroquinone is 2800 centipoises. The 0.1 mil film sensitized with a 3% blend of iso-butyl and n-butyl benzoin ether cures at 4 inches from a GE H3T7 lamp for 20 seconds gives an IFT value of 31. A 4 mil film treated as the 0.1 mil film has a heat stability of 8.9%.

Although the above examples illustrate only a few of the very many variables which can be used in the practice of the invention, it should be understood that a much wider variety of curable compositions of the present invention can be made with the ingredients shown in the description preceding these examples.

What we claim as new and desire to secure by Letters Patent of the United States is:

1. A solventless UV curable polyester composition having a viscosity of from 600 centipoises to 3000 centipoises and containing the following essential ingredients by weight:
   A. 20 to 40% of a vinyl aromatic material selected from styrene, vinyl toluene, tert-butylstyrene and mixtures thereof,
   B. 80 to 60% of an unsaturated polyester reaction product of (i) a glycol and (ii) an aliphatically unsaturated organic dicarboxylic acid, where
      i. is a glycol selected from the class consisting of
         a. a mixture of 20–60 mole percent of neopentyl glycol and 40–80 mole percent of a member selected from propylene glycol, ethylene glycol and a mixture thereof, and
         b. a mixture of (a) and 1 to 40% by weight thereof of trimethylolpropane monoallyl ether, and
      ii. is an aliphatically unsaturated organic dicarboxylic acid consisting essentially of a mixture of 50 to 65 mole percent of fumaric acid and 35 to 50 mole percent of a member selected from tetrahydrophthalic anhydride, endomethylene tetrahydrophthalic anhydride and mixtures thereof,
   where there is utilized in making the unsaturated polyester reaction product (B) (b) up to a 10% mole percent excess of the glycol of (i) over the aliphatically unsaturated organic dicarboxylic acid of (ii)
   C. 1 to 5% based on the weight of (A) and (B) of a UV sensitizer, and
   D. 0.05 to 1% based on the weight of (A), (B) and (C) of paraffin wax.

2. A solventless UV curable polyester composition of claim 1, where the vinyl aromatic material is styrene.

3. A solventless UV curable polyester composition in accordance with claim 1, where the polyester is a reaction product of tetrahydrophthalic anhydride, fumaric acid, propylene glycol and neopentyl glycol.

4. A solventless UV curable polyester composition in accordance with claim 3, where ethylene glycol is used in place of propylene glycol.

5. A polyester in accordance with claim 3, where endomethylene tetrahydrophthalic anhydride is used in place of the tetrahydrophthalic anhydride.

6. A polyester in accordance with claim 3, where trimethylolpropane monoallyl ether is used in combination with the neopentyl glycol and the propylene glycol.

* * * * *